United States Patent
Im et al.

(10) Patent No.: US 9,852,699 B2
(45) Date of Patent: Dec. 26, 2017

(54) BACKLIGHT UNIT AND DISPLAY APPARATUS INCLUDING THE SAME

(71) Applicant: Samsung Display Co., LTD., Yongin-si, Gyeonggi-Do (KR)

(72) Inventors: Taegon Im, Gwangmyeong-si (KR); Min-gyu Kim, Asan-si (KR); Youngsup Kwon, Gwangmyeong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 4 days.

(21) Appl. No.: 15/061,139

(22) Filed: Mar. 4, 2016

(65) Prior Publication Data

US 2017/0018230 A1 Jan. 19, 2017

(30) Foreign Application Priority Data

Jul. 16, 2015 (KR) .................. 10-2015-0101095

(51) Int. Cl.
*G09G 3/36* (2006.01)
*G09G 3/34* (2006.01)
*H05B 33/08* (2006.01)
*G09G 3/00* (2006.01)

(52) U.S. Cl.
CPC .......... *G09G 3/342* (2013.01); *G09G 3/3648* (2013.01); *H05B 33/0827* (2013.01); *H05B 33/0851* (2013.01); *G09G 3/003* (2013.01); *G09G 2310/08* (2013.01); *G09G 2320/0233* (2013.01); *G09G 2320/064* (2013.01); *G09G 2330/021* (2013.01); *G09G 2330/12* (2013.01)

(58) Field of Classification Search
USPC ...................................... 345/102
See application file for complete search history.

(56) References Cited

U.S. PATENT DOCUMENTS

| | | | |
|---|---|---|---|
| 8,049,439 B2 | 11/2011 | Zhao et al. | |
| 2014/0192102 A1* | 7/2014 | Im .................. | H05B 33/0827 345/691 |

FOREIGN PATENT DOCUMENTS

| | | |
|---|---|---|
| JP | 2014086689 A | 5/2014 |
| KR | 1020110139499 A | 12/2011 |
| KR | 1020130012670 A | 2/2013 |
| KR | 1020130050828 A | 5/2013 |
| KR | 1020130094884 A | 8/2013 |

* cited by examiner

*Primary Examiner* — Roy Rabindranath
(74) *Attorney, Agent, or Firm* — Cantor Colburn LLP

(57) ABSTRACT

A backlight unit includes a power converter which generates a light source power voltage at a first node in response to a voltage control signal, at least one light emitting diode string which is connected between the first node and a second node and receives the light source power voltage through the first node, and a controller connected to the second node where the controller detects current of a detection node varying based on a duty ratio of the power control signal, and controls current flowing through the second node when the detected current is greater than a reference value.

16 Claims, 9 Drawing Sheets

BACKLIGHT UNIT AND DISPLAY APPARATUS INCLUDING THE SAME

This application claims priority to Korean Patent Application No. 10-2015-0101095, filed on Jul. 16, 2015, and all the benefits accruing therefrom under 35 U.S.C. §119, the content of which in its entirety is herein incorporated by reference.

BACKGROUND

1. Field

Exemplary embodiments of the invention herein relate to a backlight unit and a display apparatus including the same.

2. Description of the Related Art

It has become essential that a display apparatus is mounted as one of user interfaces on an electronic device, and flat panel display apparatuses have been widely used for realizing slim, compact and lightweight electronic devices and minimizing power consumption of the electronic devices.

A liquid crystal display ("LCD") most widely used at present is a non-emissive device, which adjusts the amount of light incident from the outside to display images, and includes backlight units ("BLUs") including separate light sources (i.e., backlight lamps) to irradiate a liquid crystal panel with light.

Recently, a light emitting diode ("LED") having advantages including low power, eco-friendliness, and slim design has been widely used as a light source. However, the LED has a limitation in that its optical design makes it difficult to maintain the uniformity of brightness and color over the entire area of a display apparatus, and increased technology is required for the instantaneous control of LED current.

To provide brightness required by display apparatuses, backlight units may include a plurality of light emitting diode strings. To maintain uniform brightness of the plurality of light emitting diode strings, the amount of current flowing through each of the light emitting diode strings should be the same.

SUMMARY

To maintain a current flowing through light emitting diode strings, it is necessary to change a voltage level of a light source power voltage provided to the light emitting diode strings. However, when the voltage level of the light source power voltage is abruptly changed, the brightness of the displayed image may be momentarily changed.

The invention provides a backlight unit capable of preventing the deterioration of display quality of an image even though the voltage level of light source power voltage is abruptly changed.

The invention also provides a display apparatus including a backlight unit capable of maintaining the current flowing through light emitting diode strings.

An exemplary embodiment of the invention provides a backlight unit including a power converter which generates a light source power voltage to a first node in response to a voltage control signal, at least one light emitting diode string which is connected between the first node and a second node and receives the light source power voltage through the first node, and a controller connected to the second node. The controller detects current of a detection node varying based on a duty ratio of the power control signal, and controls current flowing through the second node when the detected current is greater than a reference value.

In an exemplary embodiment, the controller may include a voltage controller which outputs the voltage control signal having a pulse width corresponding to the voltage level of the second node, and a current controller which detects the current of the detection node to control the current flowing through the second node when the detected current is greater than the reference value.

In an exemplary embodiment, the current controller may include a smoothing circuit which smoothens a voltage of the detection node to output a feedback voltage, a comparison circuit which compares the feedback voltage and the reference value to output a detection voltage corresponding to a comparison result, and a feedback control circuit which controls the current flowing through the second code based on the detection voltage and the voltage level of the second node.

In an exemplary embodiment, the smoothing circuit may include a first resistor connected between the detection node and a ground voltage, a second resistor connected between the detection node and an input node, and a capacitor connected between the ground and the feedback node, the feedback voltage being a voltage of the feedback node.

In an exemplary embodiment, the comparison circuit may include a first comparison part which compares a voltage level of the input node and a first comparison reference voltage to output a first comparison signal, a second comparison part which compares the voltage level of the input node and a second comparison reference voltage to output a second comparison signal, and a switching part which outputs any one of a first voltage and the ground voltage as the detection voltage in response to the first and second comparison signals.

In an exemplary embodiment, the switching part may include a first resistor including one end connected to the first voltage and the other end, a transistor including a first electrode connected to the other end of the first resistor, a second electrode which outputs the detection voltage, and a control electrode commonly connected to the first and second comparison signals, and a second resistor connected to the second electrode of the transistor and the ground.

In an exemplary embodiment, the feedback control circuit may include a current feedback transistor including a first electrode connected to the second node, a second electrode connected to a feedback node, and a control electrode connected to a current control signal, a pull down resistor connected between the feedback node and the ground voltage, a comparator which compares the feedback node and a reference voltage and to output a comparison signal, and an adder which adds the comparison signal and the detection voltage to output the current control signal.

In an exemplary embodiment, the power converter may include an inductor connected between a power supply voltage and a first internal node, a transistor including a first electrode connected to the first internal node, a second electrode connected to the detection node, and a control electrode connected to the voltage control signal, a diode connected between the first internal node and a second internal node, and a capacitor connected between the second internal node and the ground, where the second internal node may be electrically connected to the first node.

In an exemplary embodiment, the voltage controller may include a comparator which compares a voltage level of the second node and a ramp reference voltage to output the voltage comparison signal according to a comparison result, and a latch circuit which is synchronized with the voltage comparison signal and a clock signal to output the voltage control signal.

In an exemplary embodiment of the invention, a display apparatus, includes a display panel including a plurality of pixels, a driving circuit which controls so as to display an image on the display panel, and a backlight unit which provides the display panel with light, where the backlight unit, including a power converter which generates a light source power voltage to a first node in response to a voltage control signal, at least one light emitting diode string connected between the first node and a second node, and which receives the light source power voltage through the first node, and a controller connected to the second node, where the controller detects current of a detection node varying based on a duty ratio of the power control signal, and controls current flowing through the second node when the detected current is greater than a reference value.

In an exemplary embodiment, the display panel may include a plurality of gate lines and a plurality of data lines extending in directions crossing each other, and a plurality of pixels each of which is connected to the corresponding gate lines and data lines, and the driving circuit may include a data driver which drives the plurality of data lines, a gate driver which drives the plurality of gate lines, and a timing controller which controls the data driver and the gate driver in response to an image signal and a control signal, the timing controller providing the ramp signal and the clock signal.

BRIEF DESCRIPTION OF THE FIGURES

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
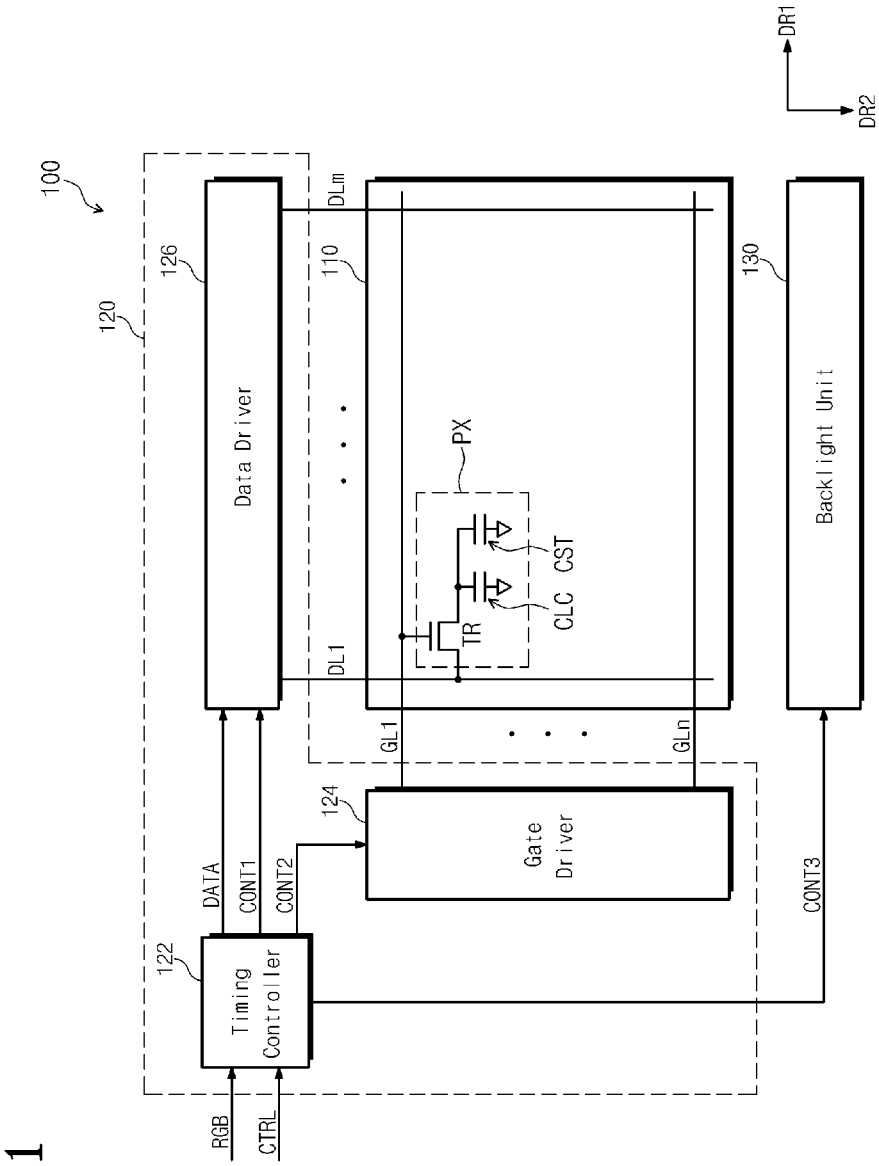
FIG. 1 is a block diagram of an exemplary embodiment of a display apparatus according to the invention.

Hereinafter, exemplary embodiments of the invention will be described in detail with reference to the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram of a display apparatus according to an exemplary embodiment of the invention.

Referring to FIG. 1, a display apparatus 100 includes a display panel 110, a driving circuit 120, and a backlight unit 130.

The display panel 110 displays an image. In the exemplary embodiment, although it is described as an example that the display panel 110 is a liquid crystal panel, the display panel 110 may be another kind of display panel including a backlight unit 130.

The display panel 110 includes a plurality of gate lines GL1 to GLn extending in a first direction DR1, a plurality of data lines DL1 to DLm extending in a second direction DR2, and a plurality of pixels arranged in crossing regions where the plurality of gate lines GL1 to GLn and the plurality of data lines DL1 to DLm cross each other. The plurality of data lines DL1 to DLm and the plurality of gate lines GL1 to GLn are insulated from each other. Each of the pixels PX includes a thin film transistor ("TFT") TR, a liquid crystal capacitor CLC, and a storage capacitor CST.

The plurality of pixels PX has the same structures. Accordingly, only the configuration of one pixel will be described, and description related to each of the other pixels PX will not be provided. The TFT TR of the pixel PX includes a gate electrode connected to the first gate line GL1 of the plurality of gate lines GL1 to GLn, a source electrode connected to the first data line DL1 of the plurality of data lines DL1 to DLm, and a drain electrode commonly connected to both of the liquid crystal capacitor CLC and the storage capacitor CST. One ends of the liquid crystal capacitor CLC and storage capacitor CST are connected in parallel to the drain electrode of the TFT TR. The other ends of the liquid crystal capacitor CLC and storage capacitor CST are connected to a common voltage.

The driving circuit 120 includes a timing controller 122, a gate driver 124, and a data driver 126. The timing controller 122 receives an image signal RGB and a control signal CTRL from the outside. In an exemplary embodiment, the control signals CTRL includes, for example, a vertical synchronization signal, a horizontal synchronization signal, a main clock signal, and a data enable signal. The timing controller 122 provides the data driver 126 with a first control signal CONT1 and an image data signal DATA which is obtained by processing the image signal RGB based on the control signals CTRL to be adapted for an operation condition of the display panel 110, and, and provides the gate driver 124 with a second control signal CONT2. In an exemplary embodiment, the first control signal CONT1 may include a horizontal synchronization start signal, a clock signal, and a line latch signal, and the second control signal CONT2 may include a vertical synchronization start signal, an output enable signal, and a gate pulse signal, for example. The timing controller 122 may variously modify the image data signal DATA according to an arrangement of the pixels PX of the display panel 110 and a display frequency, etc. The timing controller 122 provides the backlight unit 130 with a third control signal CONT3 for controlling the backlight unit 130.

The gate driver 124 drives the plurality of gate lines GL1 to GLn in response to the second control signal CONT2 from the timing controller 122. In an exemplary embodiment, the gate driver 124 may include a gate driving integrated circuit ("IC"). In an exemplary embodiment, the gate driver 124 may also be implemented as a circuit including an oxide semiconductor, an amorphous semiconductor, polycrystalline semiconductor, etc., for example.

The data driver 126 drives the data lines DL1 to DLm in response to the image data signal DATA from the timing controller 122 and the first control signal CONT1.

The backlight unit 130 may be arranged under the display panel 110 to face the pixels PX. The backlight unit 130 operates in response to a third control signal CONT3 from the timing controller 122. Specific configurations and operations of the backlight unit 130 will be described in detail with reference to FIG. 2.

Figure 2:
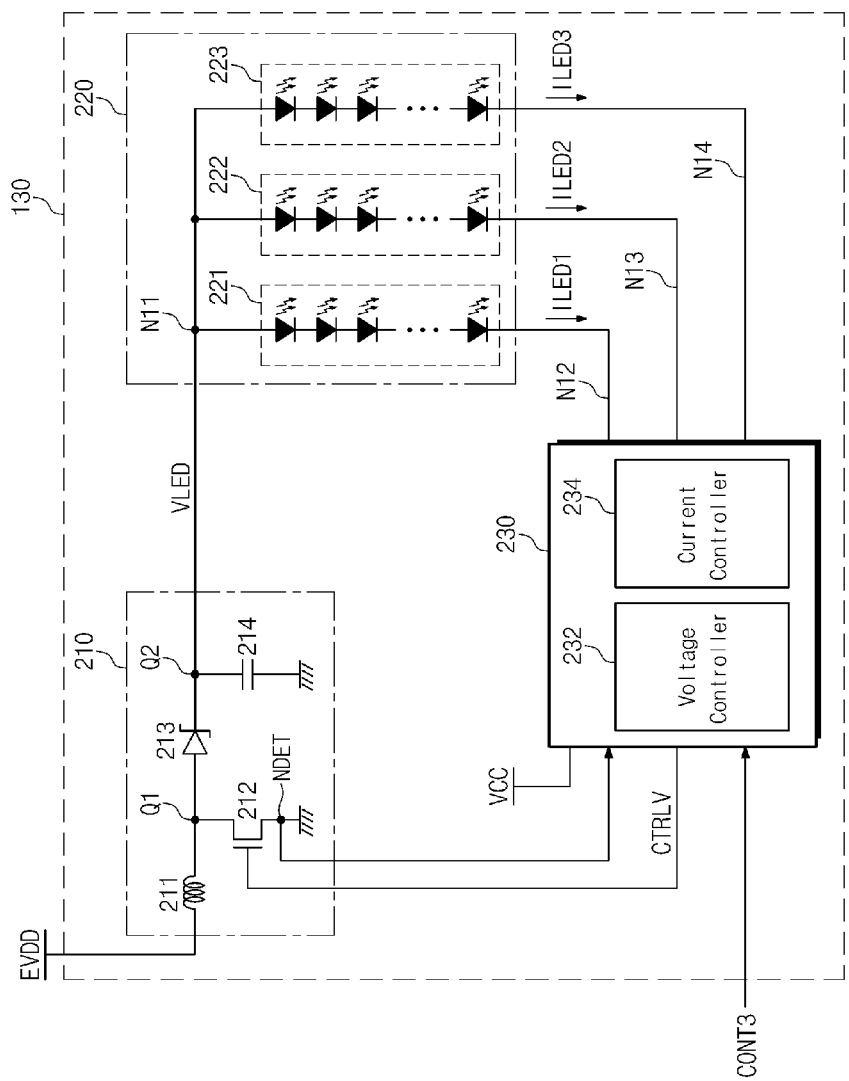
FIG. 2 is a view illustrating a configuration of an exemplary embodiment of a backlight unit illustrated in FIG. 1 according to the invention.

FIG. 2 is a view illustrating a configuration of a backlight unit illustrated in FIG. 1 according to an exemplary embodiment of the invention.

Referring to FIG. 2, the backlight unit 130 includes a power converter 210, a light source 220, and a light source controller 230. In the exemplary embodiment, although it is described as an example that the backlight unit 130 is used as a light source of the display panel 110 illustrated in FIG. 1, the backlight unit 130 may be used in various application fields, such as illumination, advertisement panel.

The power converter 210 converts a power supply voltage EVDD inputted from the outside into a light source power voltage VLED. The voltage level of the light source power voltage VLED is set at a voltage level sufficient for an operation of the light source 220.

The power converter 210 includes an inductor 211, a transistor 212, a diode 213, and a capacitor 214. The inductor 211 is connected between the power supply voltage EVDD and a first internal node Q1. The transistor 212 is connected between the first internal node Q1 and the ground. The transistor 212 includes a first electrode connected to the first internal node Q1, a second electrode connected to the light source controller 230, and a control electrode connected to a voltage control signal CTRLV from the light source controller 230. In the exemplary embodiment illustrated in FIG. 2, the transistor 212 is an NMOS transistor but may be configured as other types of transistors.

The diode 213 is connected between the first internal node Q1 and the second internal node Q2. In the exemplary embodiment, the diode 213 may be configured as a schottky diode, for example. The capacitor 214 is connected between the second internal node Q2 and the ground. The light source power voltage VLED of the second internal node Q2 is supplied to the light source 220.

The power converter 210 configured as mentioned above, converts a power supply voltage EVDD inputted from the outside into a light source power voltage VLED and outputs the light source power voltage VLED. Especially, the voltage level of the light source power voltage VLED may be adjusted through turning on/off the transistor 212 according to the voltage control signal CTRLV applied to the gate of the transistor 212.

The light source 220 includes a plurality of light emitting diode ("LED") strings 221, 222, and 223. In the exemplary embodiment, although it is illustrated and described that the light source 220 includes three LED strings 221, 222, and 223, the number of the LED strings may be variously changed.

Each of the LED strings 221, 222, and 223 includes a plurality of serially connected LEDs. In an exemplary embodiment, each of the plurality of LEDs may include a white LED emitting a white color, a red LED emitting a red color, a blue LED emitting a blue color, and a green LED emitting a green color, for example. The white, red, blue, and green LEDs have different light emitting properties, respectively, and particularly, may have forward driving voltages different from each other which should be applied to emit light. To reduce power consumption, the LEDs may be configured as LEDs driven by low forward driving voltages in general. Also, the smaller the deviation of the forward driving voltage of the LEDs is, the better uniform brightness is. In the exemplary embodiment, the light source 220 includes the LED strings 221, 222, and 223 each including a plurality of LEDs, and the LEDs may include a laser diode and a carbon nanotube, for example.

An end of each of the LED strings 221, 222, and 223 is connected to a first node N11 which receives the light source voltage VLED from the power converter 210. The other ends of the LED strings 221, 222, and 223 of the LED strings, that is, the nodes N12, N13, and N14, are connected to the light source controller 230.

The light source controller 230 receives the power voltage VCC. The light source controller 230 outputs the voltage control signal CTRLV corresponding to a voltage level fed back from the LED strings 221, 222, and 223 in response to the third control signal CONT3 from the timing controller 122 illustrated in FIG. 1

The light source controller 230 includes a voltage controller 232 and a current controller 234. The voltage controller 232 outputs the voltage control signal CTRLV having a pulse width corresponding to the voltage change of the other end of each of the LED strings 221, 22, 223, that is, the nodes N12, N13, and N14. The current controller 234 detects the current change of the second electrode of the transistor 212 in the power converter 210, and when the current change is greater than a reference value, controls the current following through the other end of each of the LED strings 221, 222, and 223, that is, the nodes N12, N13, and N14.

In an exemplary embodiment, when the pulse width of the voltage control signal CTRLV increases, the turn-on time of the transistor 212 becomes longer. As the turn-on time of the transistor 212 becomes longer, the voltage level of the light source power voltage VLED becomes higher, for example. When the voltage level of the light source power voltage VLED rapidly becomes higher, the brightness of the LEDs in the LED strings 221, 222, and 223 rises. A rapid rise in brightness causes the deterioration of display quality.

The current controller 234 temporarily increases an amount of the current flowing through the nodes N12, N13, and N14, when the change in the current IFB flowing through the second electrode of the transistor 212, i.e., the detection node NDET, is greater than the reference value. As the pulse width of the voltage control signal CTRLV increases, the amount of current flowing through the nodes N12, N13, and N14 is temporarily increases even though the voltage level of the light source power voltage VLED is rapidly becomes higher. Thus, the rapid change in the brightness of the LEDs in the LED strings 221, 222, and 223 may be prevented.

Figure 3:
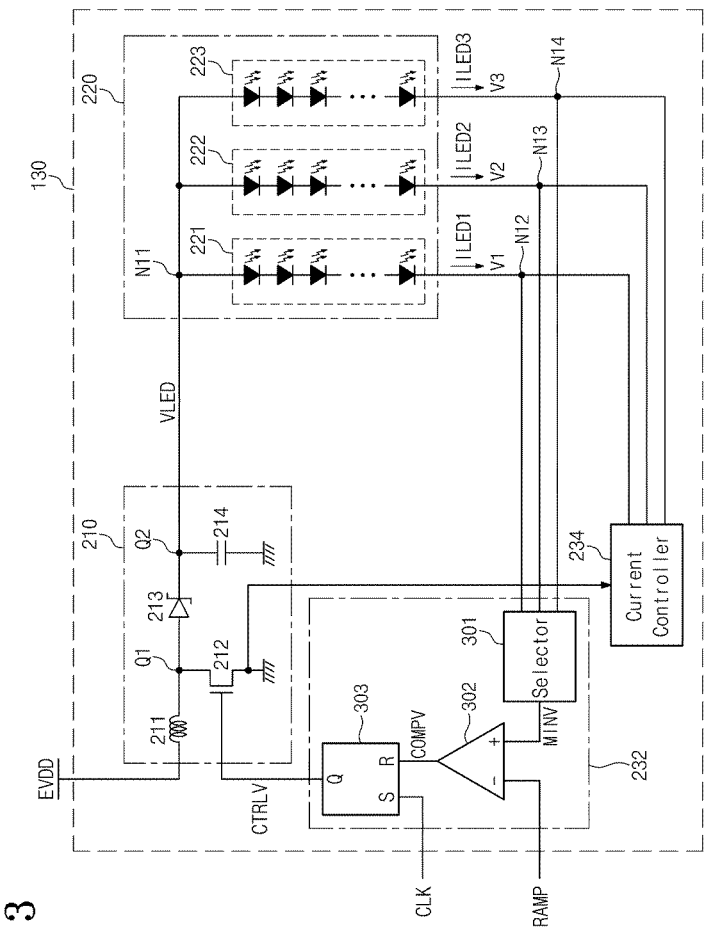
FIG. 3 is a view exemplarily illustrating a configuration of a voltage controller illustrated in FIG. 2.

FIG. 3 is a view exemplarily illustrating a configuration of a voltage controller illustrated in FIG. 2.

Referring to FIG. 3, the voltage controller 232 includes a selector 301, a comparator 302, and a latch circuit 303. The selector 301 is electrically connected to the other end of each of the LED strings 221, 222, and 223, that is, the nodes N12, N13, and N14. The selector 301 selects the lowest voltage from among the voltages V1, V2, and V3 of the respective nodes N12, N13, and N14, and outputs the selected voltage as a minimum voltage MINV. The selector 301 may select an LED string having the greatest voltage drop from among the LED strings 221, 222, and 223 by selecting the lowest voltage from among the voltages V1, V2, and V3 of the respective nodes N12, N13, and N14. That is, the voltage controller 232 may output the voltage control signal CTRLV based on the voltage of the LED string having the largest voltage drop.

The comparator 302 includes a non-inverting input terminal (+) receiving the minimum voltage MINV from the selector 301, an inverting input terminal (−) receiving a ramp signal RAMP, and an output terminal outputting a voltage comparison signal COMPV. The comparator 302 compares the minimum voltage MINV and the ramp signal RAMP and outputs the voltage comparison signal COMPV. In an exemplary embodiment, the ramp signal RAMP is a periodic signal having a shape of a triangular pulse, for example.

The latch circuit 303 is synchronized with the voltage comparison signal COMP and a clock signal CLK and outputs the voltage control signal CTRLV. The third control signal CONT3 provided from the timing controller 122 illustrated in FIG. 1 includes the ramp signal RAMP and the clock signal CLK.

Figure 4:
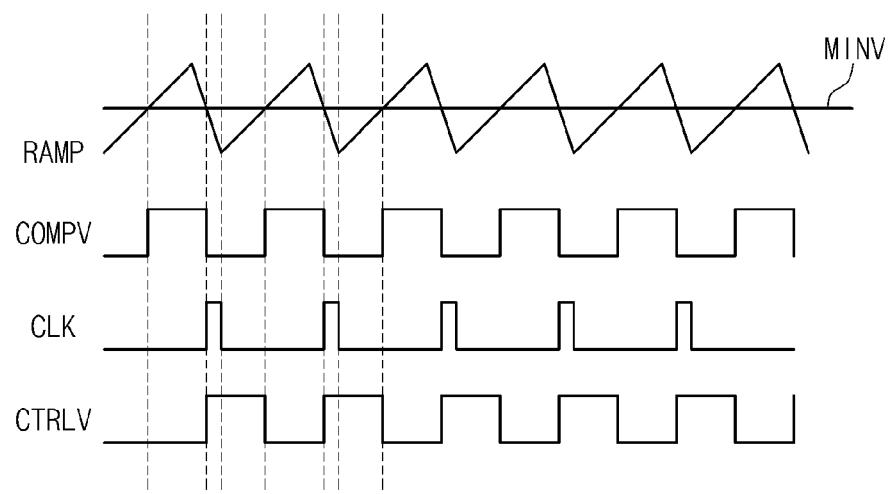
FIG. 4 is a timing diagram of signals according to an operation of a voltage controller illustrated in FIG. 3.

FIG. 4 is a timing diagram of signals according to an operation of a voltage controller illustrated in FIG. 3.

Referring to FIGS. 3 and 4, the comparator 302 compares the minimum voltage MINV and the ramp signal RAMP from the selector 301, and outputs the voltage comparison signal COMPV. As the voltage level of the minimum voltage MINV becomes lower, the pulse width of the voltage comparison signal COMPV becomes wider, and as the voltage level of the minimum voltage MINV becomes higher, the pulse width of the voltage comparison signal COMPV becomes narrower.

The latch circuit 303 is synchronized with the voltage comparison signal COMP and a clock signal CLK and outputs the voltage control signal CTRLV. Since the pulse width of the clock signal is constant, the pulse width of the voltage control signal CTRLV is determined according to the pulse width of the voltage comparison signal COMPV. As the pulse width of the voltage control signal CTRLV becomes longer, the voltage level of the light source power voltage VLED becomes higher because the turn-on time of the transistor 212 increases. On the contrary, as the pulse width of the voltage control signal CTRLV becomes shorter, the voltage level of the light source power voltage VLED becomes lower because the turn-on time of the transistor 212 decreases. In other words, since the pulse width of the voltage control signal CTRLV is determined according to the voltage level of the minimum voltage MINV, the light source power voltage VLED may be controlled according to the voltage level of the minimum voltage MINV.

Figure 5:
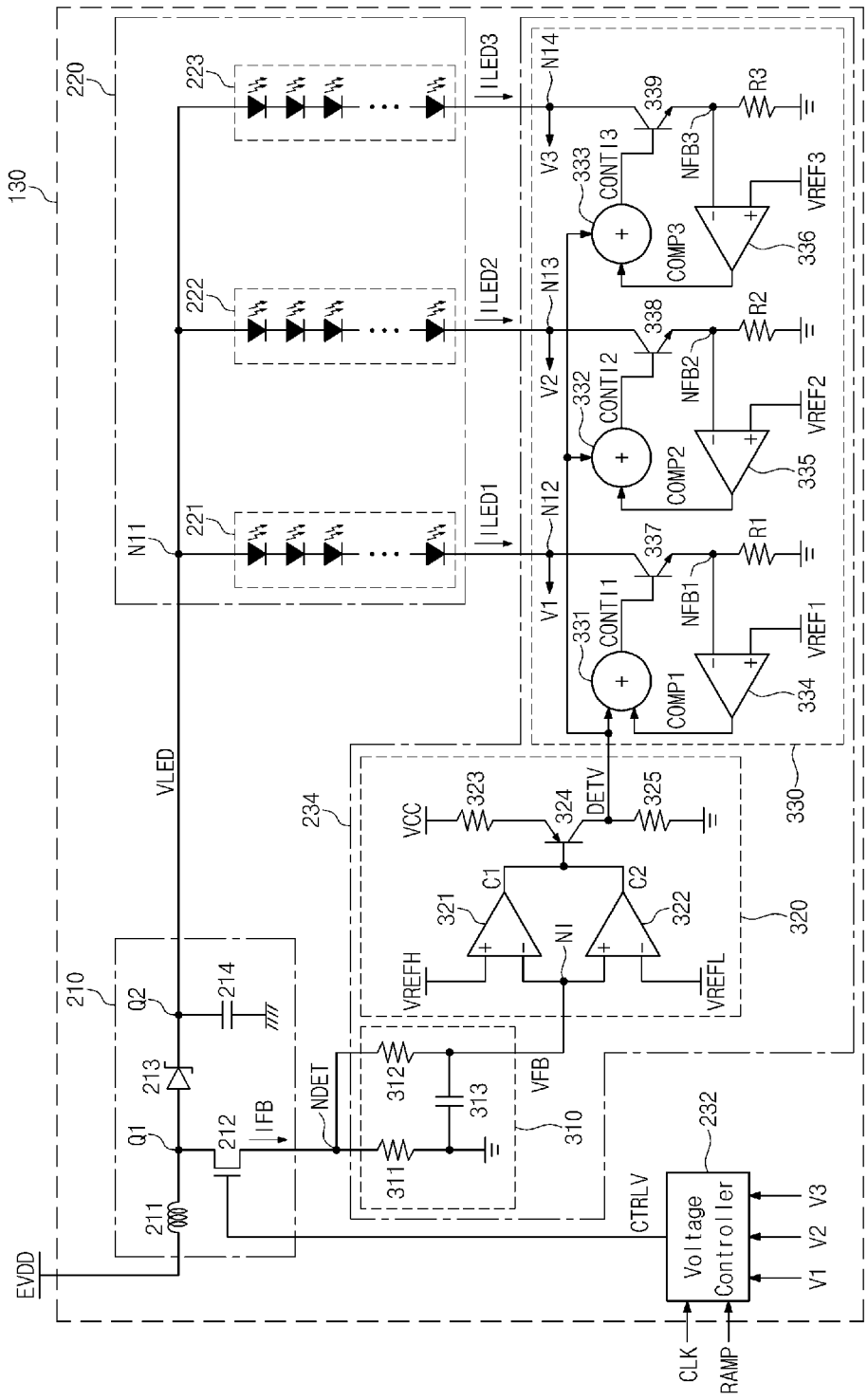
FIG. 5 is a view illustrating a configuration of an exemplary embodiment of a current controller illustrated in FIG. 2 according to the invention.

FIG. 5 is a view illustrating a configuration of a current controller illustrated in FIG. 2 according to an exemplary embodiment of the invention.

Referring to FIG. 5, the current controller 234 includes a smoothing circuit 310, a comparison circuit 320, and a feedback control circuit 330.

The smoothing circuit 310 includes resistors 311 and 312, and a capacitor 313. The resistor 311 is connected between the detection node NDET and the ground. The resistor 312 is connected between the detection node NDET and an input node NI. The capacitor 313 is connected between the ground and the input node NI. The smoothing circuit 310 configured as mentioned above smoothens the voltage of the second electrode of the transistor 212, that is, the detection node NDET, and outputs the feedback voltage VFB to the input node NI.

The comparison circuit 320 includes a first comparator 321, a second comparator 322, resistors 323 and 325, and a transistor 324. The first comparator 321 includes a non-inverting input terminal receiving an upper limit reference voltage VREFH, an inverting input terminal receiving a feedback voltage VFB through the input node NI, and an output terminal outputting a first comparison signal C1. The second comparator 322 includes a non-inverting input terminal receiving a feedback voltage VFB through the input node NI, an inverting input terminal receiving a lower limit reference voltage VREFL, and an output terminal outputting a second comparison signal C2.

One end of the resistor 323 is connected to the power voltage VCC. One end of the resistor 325 is connected to the ground. The transistor 324 includes a first electrode connected to the other end of the resistor 323, a second electrode connected to one end of the resistor 325, and a control electrode commonly connected to the output terminals of the first and second comparators 321 and 322.

The comparison circuit 320 compares the feedback voltage VFB and the reference voltages VREFH and VREFL, and outputs a detection voltage DETV corresponding to the comparison results. Specifically, the first comparator 321 in the comparison circuit 320 outputs a high-level first comparison signal C1 when the feedback voltage VFB inputted through the input node NI is lower than the upper limit reference voltage VREFH. The second comparator 322 outputs a high-level second comparison signal C2 when the feedback voltage VFB inputted through the input node NI is higher than the lower limit reference voltage VREFL. Therefore, when the feedback voltage VFB is lower than the upper limit reference voltage VREFH, and is higher than the lower limit reference voltage VREFL, the transistor 324 is turned on.

The feedback control circuit 330 includes adders 331, 332, and 333, comparators 334, 335, and 336, and transistors 337, 338, and 339.

The adder 331 receives the detection voltage DETV from the comparison circuit 320 and the comparison signal COMP1 outputted from the comparator 334, and outputs a current control signal CONTI1. The transistor 337 includes a first electrode connected to a node N12, a second electrode connected to a feedback node NFB1, and a control electrode connected to the current control signal CONTI1 outputted from the adder 331. The comparator 334 includes an inverting input terminal connected to the feedback node NFB1, a non-inverting input terminal connected to a first reference voltage VREF1, and an output terminal outputting a comparison signal COMP1.

The comparator 334 outputs a high-level comparison signal COMP1 when the voltage of the feedback node NFB1 is lower than the first reference voltage VREF1, and outputs a low-level comparison signal COMP1 when the voltage of the feedback node NFB1 is higher than the first reference voltage VREF1. The adder 331 adds the detection voltage DETV from the comparison circuit 320 and the comparison signal COMP1 outputted from the comparator 334, and outputs a current control signal CONTI1. The transistor 337 may be turned on when the voltage of the feedback node NFB1 is lower than the first reference voltage VREF1, or the feedback voltage VFB is lower than the upper limit reference voltage VREFH and is higher than the lower limit reference voltage VREFL.

The adder 332 receives the detection voltage DETV from the comparison circuit 320 and the comparison signal COMP2 outputted from the comparator 335, and outputs a current control signal CONTI2. The transistor 338 includes a first electrode connected to a node N13, a second electrode connected to a feedback node NFB2, and a control electrode connected to the current control signal CONTI2 outputted from the adder 332. The comparator 335 includes an inverting input terminal connected to the feedback node NFB2, a non-inverting input terminal connected to a second reference voltage VREF2, and an output terminal outputting a comparison signal COMP2.

The comparator 335 outputs a high-level comparison signal COMP2 when the voltage of the feedback node NFB2 is lower than the second reference voltage VREF2, and outputs a low-level comparison signal COMP2 when the voltage of the feedback node NFB2 is higher than the second reference voltage VREF2. The adder 332 receives the detection voltage DETV from the comparison circuit 320 and the comparison signal COMP2 outputted from the comparator 335, and outputs a current control signal CONTI2. The transistor 338 may be turned on when the voltage of the feedback node NFB2 is lower than the second reference voltage VREF2, or the feedback voltage VFB is lower than the upper limit reference voltage VREFH and is higher than the lower limit reference voltage VREFL. The adder 333 receives the detection voltage DETV from the comparison circuit 320 and the comparison signal COMP3 outputted from the comparator 336, and outputs a current control signal CONTI3. The transistor 339 includes a first electrode connected to a node N14, a second electrode connected to a feedback node NFB3, and a control electrode connected to the current control signal CONTI3 outputted from the adder 333. The comparator 336 includes an inverting input terminal connected to the feedback node NFB3, a non-inverting input terminal connected to a third reference voltage VREF3, and an output terminal outputting a comparison signal COMP3.

The comparator 336 outputs a high-level comparison signal COMP3 when the voltage of the feedback node NFB3 is lower than the third reference voltage VREF3, and outputs a low-level comparison signal COMP3 when the voltage of the feedback node NFB3 is higher than the third reference voltage VREF3. The adder 333 receives the detection voltage DETV from the comparison circuit 320 and the comparison signal COMP3 outputted from the comparator 336, and outputs a current control signal CONTI3. The transistor 339 may be turned on when the voltage of the feedback node NFB3 is lower than the third reference voltage VREF3, or the feedback voltage VFB is lower than the upper limit reference voltage VREFH and is higher than the lower limit reference voltage VREFL. The first, second, and third comparison voltages VREF1, VREF2, and VREF3 may have the same voltage levels or may be set at voltage levels different from each other.

When the pulse width of the voltage control signal CTRLV provided to the control electrode of the transistor 212 becomes longer to increase the amount of the current flowing through the detection node NDET, the feedback control circuit 330 configured as mentioned above turns on the transistors 337, 338, and 339 in the feedback control circuit 330, and firstly increases the amount of current flowing through the LED strings 221, 222, and 223. As the turn-on time of the transistor 212 becomes longer, the amount of current flowing through the LED strings 221, 222, and 223 during the boosting of the light source power voltage VLED, so that a rapid change in the brightness of the LED strings 221, 22, and 223 may be prevented.

Figure 6:
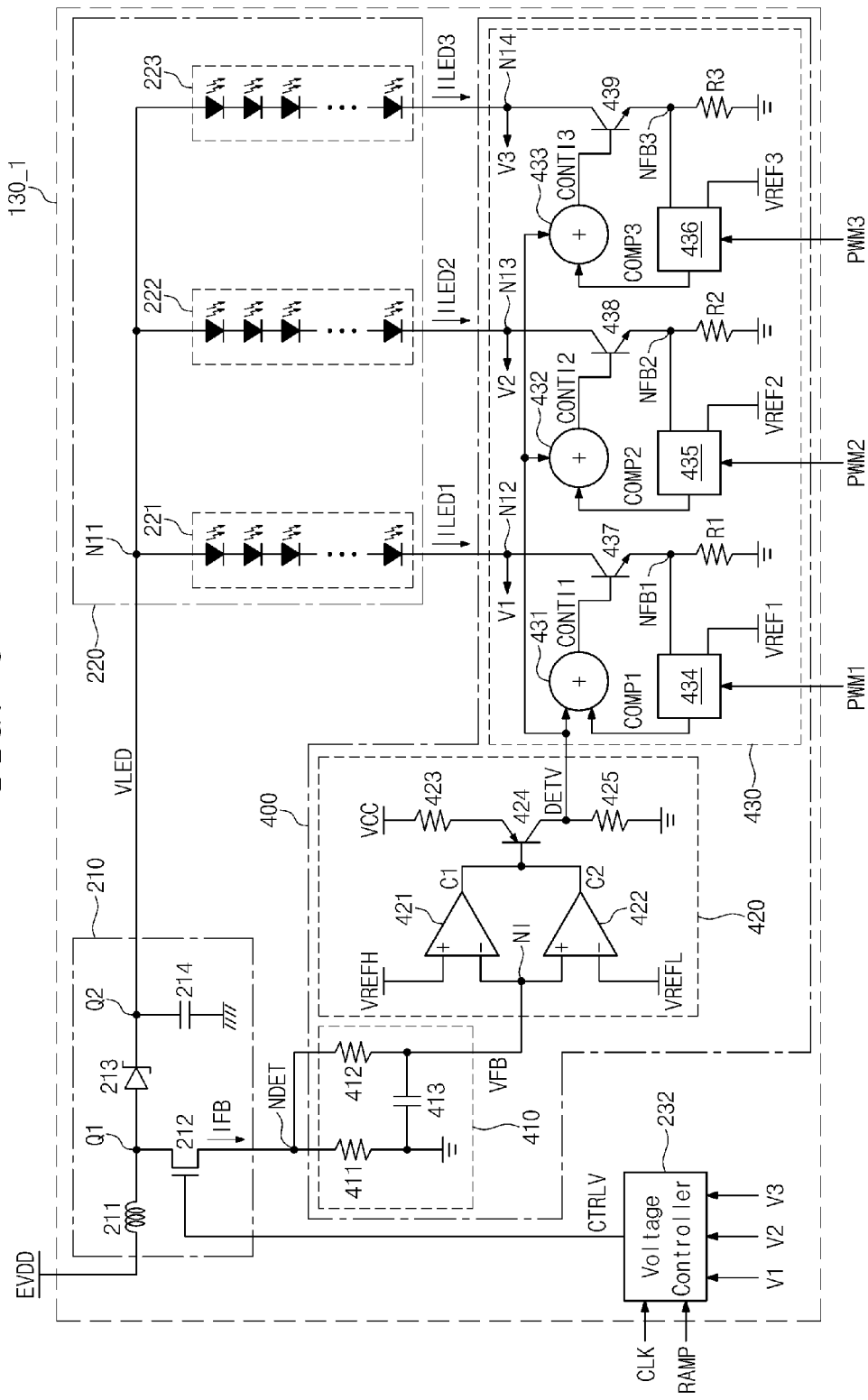
FIG. 6 is a view illustrating a configuration of another exemplary embodiment of a current controller illustrated in FIG. 2 according to the invention.

FIG. 6 is a view illustrating a configuration of a current controller illustrated in FIG. 2 according to another exemplary embodiment of the invention.

Referring to FIG. 6, the current controller 400 of the backlight unit 130_1 includes a smoothing circuit 410, a comparison circuit 420, and a feedback control circuit 430. Since the smoothing circuit 410 including resistors 411 and 412, and a capacitor 413 and the comparison circuit 420 including a first comparator 421, a second comparator 422, resistors 423 and 425, and a transistor 424 illustrated in FIG. 6 have the same configuration as the smoothing circuit 310 and the comparison circuit 320 illustrated in FIG. 5, redundant descriptions will not be provided.

The feedback control circuit 430 includes adders 431, 432, and 433, PWM controllers 434, 435, and 436, and transistors 437, 438, and 439.

The adder 431 receives the detection voltage DETV from the comparison circuit 420 and the comparison signal COMP1 outputted from the PWM controller 434, and outputs a current control signal CONTI1. The transistor 437 includes a first electrode connected to a node N12, a second electrode connected to a feedback node NFB1, and a control electrode connected to the current control signal CONTI1 outputted from the adder 431.

The PWM controller 434 receives the voltage of the feedback node NFB1, a first reference voltage VREF1, and a PWM signal PWM1, and includes an output terminal outputting the comparison signal COMP1. The PWM controller 434 compares the voltage of the feedback node NFB1 and the first reference voltage VREF1 while the PWM signal PWM1 is at a high level. The comparator 434 outputs a high-level comparison signal COMP1 when the voltage of the feedback node NFB1 is lower than the first reference voltage VREF1, and outputs a low-level comparison signal COMP1 when the voltage of the feedback node NFB1 is higher than the first reference voltage VREF1. The adder 431 adds the detection voltage DETV from the comparison circuit 420 and the comparison signal COMP1 outputted from the comparator 434, and outputs a current control signal CONTI1. The transistor 437 may be turned on when the voltage of the feedback node NFB1 is lower than the first reference voltage VREF1, or the feedback voltage VFB is lower than the upper limit reference voltage VREFH and is higher than the lower limit reference voltage VREFL.

The adder 432 receives the detection voltage DETV from the comparison circuit 420 and the comparison signal COMP2 outputted from the PWM controller 435, and outputs a current control signal CONTI2. The transistor 438 includes a first electrode connected to a node N13, a second electrode connected to a feedback node NFB2, and a control electrode connected to the current control signal CONTI2 outputted from the adder 432. The PWM controller 435 receives the voltage of the feedback node NFB2, a second reference voltage VREF2, and a PWM signal PWM2, and includes an output terminal outputting the comparison signal COMP2.

The PWM controller 435 compares the voltage of the feedback node NFB2 and the second reference voltage VREF2 while the PWM signal PWM2 is at a high level. The comparator 435 outputs a high-level comparison signal COMP2 when the voltage of the feedback node NFB2 is lower than the second reference voltage VREF2, and outputs a low-level comparison signal COMP2 when the voltage of the feedback node NFB2 is higher than the second reference voltage VREF2. The adder 432 adds the detection voltage DETV from the comparison circuit 420 and the comparison signal COMP2 outputted from the PWM controller 435, and outputs a current control signal CONTI2. The transistor 438 may be turned on when the voltage of the feedback node NFB2 is lower than the second reference voltage VREF2, or the feedback voltage VFB is lower than the upper limit reference voltage VREFH and is higher than the lower limit reference voltage VREFL.

The adder 433 receives the detection voltage DETV from the comparison circuit 420 and the comparison signal COMP3 outputted from the PWM controller 436, and outputs a current control signal CONTI3. The transistor 439 includes a first electrode connected to a node N14, a second electrode connected to a feedback node NFB3, and a control electrode connected to the current control signal CONTI3 outputted from the adder 433. The PWM controller 436 receives the voltage of the feedback node NFB3, the third reference voltage VREF3, and the PWM signal PWM3, and includes an output terminal outputting the comparison signal COMP3. The PWM controller 436 compares the voltage of the feedback node NFB3 and the third reference voltage VREF3 while the PWM signal PWM3 is at a high level.

The PWM controller 436 compares the voltage of the feedback node NFB3 and the third reference voltage VREF3 while the PWM signal PWM3 is at a high level. The comparator 436 outputs a high-level comparison signal COMP3 when the voltage of the feedback node NFB3 is lower than the third reference voltage VREF3, and outputs a low-level comparison signal COMP3 when the voltage of the feedback node NFB3 is higher than the third reference voltage VREF3. The adder 433 receives the detection voltage DETV from the comparison circuit 420 and the comparison signal COMP3 outputted from the PWM controller 436, and outputs a current control signal CONTI3. The transistor 439 may be turned on when the voltage of the feedback node NFB3 is lower than the third reference voltage VREF3, or the feedback voltage VFB is lower than the upper limit reference voltage VREFH and is higher than the lower limit reference voltage VREFL.

The third control signal CONT3 provided from the timing controller 122 illustrated in FIG. 1 includes the PWM signals PWM1, PWM2, and PWM3.

Figure 7:
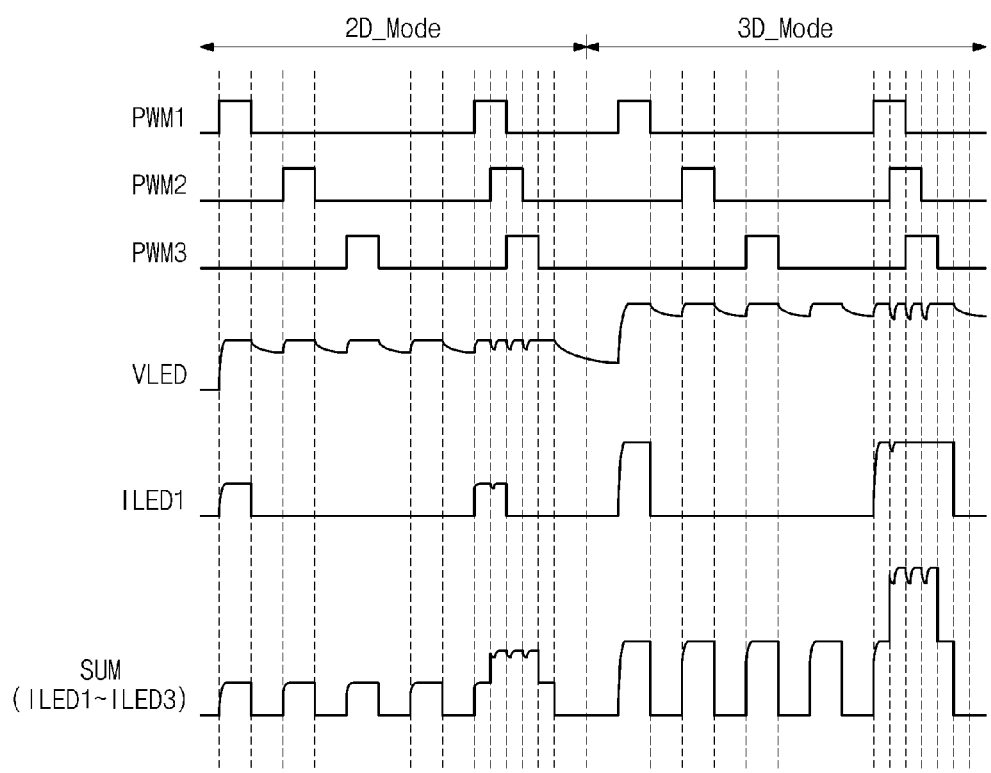
FIG. 7 is a timing diagram exemplarily illustrating a change in current flowing through LED strings when a comparison circuit in a current controller illustrated in FIG. 6 does not operate.

FIG. 7 is a timing diagram exemplarily illustrating a change in the current flowing through LED strings when a comparison circuit in a current controller 400 illustrated in FIG. 6 does not operate.

Referring to FIGS. 6 and 7, as the PWM signals PWM1, PWM2, and PWM3 are sequentially activated to high levels, the light source power voltage VLED varies according to the voltage levels of the nodes N12, N13, and N14. In an exemplary embodiment, when the PWM signals PWM1, PWM2, and PWM3 overlap and are activated to high levels, the varying period of the voltage level of the light source power voltage VLED becomes shorter and affects the current ILED1 flowing through the LED string 221. When a change in the current ILED1 occurs while the LED string 221 is turned on, a change in the brightness of the LED string 221 may be caused.

Especially, when the operation mode of the display apparatus 100 illustrated in FIG. 1 is changed from a 2D_Mode into a 3D_Mode, the voltage level of the light source power voltage VLED rapidly becomes higher. According to the rapid change of the voltage level of the light source power voltage VLED, the current ILED1 flowing through the LED string 221 should be increased. However, when the turn-on timing of the transistor 437 is delayed such that the increasing speed of the current ILED1 is slow, the LED string 221 may not emit light with a target brightness level.

Figure 8:
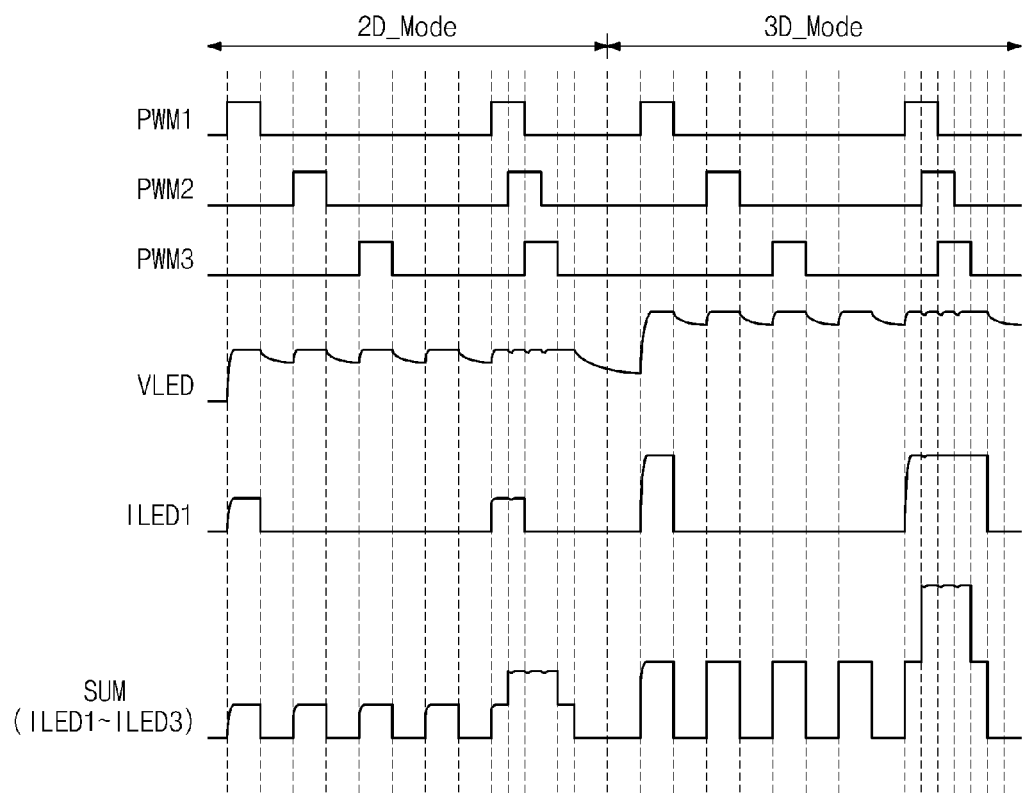
FIG. 8 is a timing diagram exemplarily illustrating a change in current flowing through LED strings when a comparison circuit in a current controller illustrated in FIG. 6 operates.

FIG. 8 is a timing diagram exemplarily illustrating a change in the current flowing through an LED string when a comparison circuit in a current controller 400 illustrated in FIG. 6 operates.

Referring to FIGS. 6 and 8, as the PWM signals PWM1, PWM2, and PWM3 are sequentially activated to high levels, the light source power voltage VLED varies according to the voltage levels of the nodes N12, N13, and N14. When the change in the current of the detection node NDET according to the change in pulse width of the voltage control signal CTRLV is greater than a reference value, the transistors 437, 438, and 439 in the feedback control circuit 430 are turned on. Since the changed light source power voltage VLED is provided to the LED strings 221, 222, and 223 while the transistors 437, 438, and 439 are firstly turned on, the LED strings 221, 222, and 223 may rapidly emit light with the target brightness. Also, even though the PWM signals PWM1, PWM2, and PWM3 overlap and are activated to high levels, the level of the current ILED1 flowing through the LED string 221 may be stably maintained.

When the operation mode of the display apparatus 100 illustrated in FIG. 1 is changed from a 2D_Mode into a 3D_Mode displaying a 3D image, the voltage level of the light source power voltage VLED rapidly becomes higher. Even though the voltage level of the light source power voltage VLED rapidly becomes higher, current may be immediately flow through the LED strings 221, 222, and 223 because the transistors 437, 438, and 439 are firstly changed into turned-on states. Accordingly, the LED strings 221, 222, and 223 may emit light with the target brightness.

Figure 9:
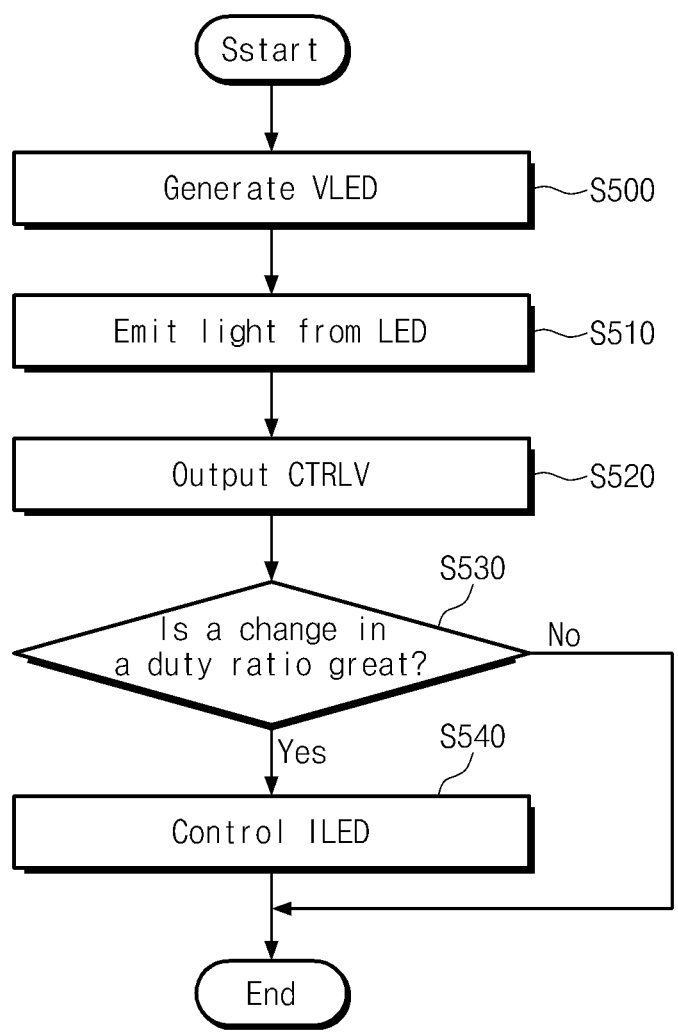
FIG. 9 is a flowchart illustrating an operation of an exemplary embodiment of a backlight unit according to the invention.

FIG. 9 is a flowchart illustrating an operation of a backlight unit according to an exemplary embodiment of the invention.

Referring to FIGS. 2 and 9, the power converter 210 generates a light source power voltage VLED (operation S500). When the light source power voltage VLED is provided, LED strings 221, 222, and 223 emit light (operation S510). A voltage controller 232 generates a voltage control signal CTRLV according to the voltages at nodes N12, N13, and N14 of the LED strings 221, 222, and 223 (operation S520).

The amount of current change at a detection node NDET according to a change in the duty ratio of the voltage control signal CTRLV is detected (operation S530). When the current change at the detection node NDET is greater than a reference value, current ILED1, ILED2, and ILED3 flowing through the LED strings 221, 222, and 223 are controlled (operation S540). In an exemplary embodiment, when the current change at the detection node NDET is greater than the reference value, transistors 437, 438 and 439 illustrated in FIG. 6 are firstly turned on such that currents ILED1, ILED2, and ILED3 are firstly allowed to flow through the LED strings 221, 222, and 223. Then, boosted light source power voltage VLED are allowed to be provided to a first node N11 of the LED strings 221, 222, and 223.

A backlight unit configured as mentioned above detects a rapid change in a duty ratio of a voltage control signal and increase the amount of current flowing through the light emitting diode strings. Accordingly, even though the voltage level of a light source power voltage is rapidly changed, the deterioration in display quality of images may be prevented.

While exemplary embodiments are described above, a person skilled in the art may understand that many modifications and variations may be made without departing from the spirit and scope of the invention defined in the following claims. Also, embodiments disclosed in the invention are not intended to limit the technical spirit of the invention and the following claims and all technical spirits falling within equivalent scope are construed as being included in the scope of rights of the invention.

What is claimed is:

1. A backlight unit, comprising:
a power converter which generates a light source power voltage to a first node in response to a voltage control signal;
at least one light emitting diode string which is connected between the first node and a second node, and receives the light source power voltage through the first node; and
a controller connected to the second node,
wherein the controller detects current of a detection node of the power converter varying based on a duty ratio of the voltage control signal, and controls current flowing through the second node when the detected current is greater than a reference value,
wherein the controller comprises:
a voltage controller which outputs the voltage control signal having a pulse width corresponding to a voltage level of the second node: and
a current controller which detects the current of the detection node, and controls the current flowing through the second node when the detected current is greater than the reference value,
wherein the current controller comprises:
a comparison circuit which compares a feedback voltage corresponding to the current of the detection node and the reference value to output a detection voltage corresponding to a comparison result; and
a feedback control circuit which controls the current flowing through the second node based on the detection voltage and the voltage level of the second node.

2. The backlight unit of claim 1, wherein the current controller further comprises:
a smoothing circuit which smoothens a voltage of the detection node to output the feedback voltage.

3. The backlight unit of claim 2, wherein the comparison circuit comprises:
a first comparison part which compares a voltage level of the input node and a first comparison reference voltage to output a first comparison signal;

a second comparison part which compares the voltage level of the input node and a second comparison reference voltage to output a second comparison signal; and a switching part which outputs any one of a first voltage and a ground voltage as the detection voltage in response to the first and second comparison signals.

4. The backlight unit of claim 2, wherein the feedback control circuit comprises:

a current feedback transistor including a first electrode connected to the second node, a second electrode connected to a feedback node, and a control electrode connected to a current control signal;

a pull down resistor connected between the feedback node and a ground;

a comparator which compares a feedback voltage of the feedback node and a reference voltage and to output a comparison signal; and an adder which adds the comparison signal and the detection voltage to output the current control signal.

5. The backlight unit of claim 3, wherein the switching part comprises:

a first resistor including one end which receives the first voltage and the other end;

a transistor including a first electrode connected to the other end of the first resistor, a second electrode which outputs the detection voltage, and a control electrode commonly connected to the first and second comparison signals; and a second resistor connected to the second electrode of the transistor and a ground.

6. The backlight unit of claim 2, wherein the smoothing circuit comprises:

a first resistor connected between the detection node and a ground;

a second resistor connected between the detection node and an input node; and a capacitor connected between the ground and a feedback node, the feedback voltage being a voltage of the feedback node.

7. The backlight unit of claim 1, wherein the power converter comprises:

an inductor connected between a power supply voltage and a first internal node;

a transistor including a first electrode connected to the first internal node, a second electrode connected to a detection node, and a control electrode connected to the voltage control signal;

a diode connected between the first internal node and a second internal node; and a capacitor connected between the second internal node and a ground, wherein the second internal node is electrically connected to the first node.

8. The backlight unit of claim 1, wherein the voltage controller comprises:

a comparator which compares a voltage level of the second node and a ramp reference voltage to output a voltage comparison signal according to a comparison result; and a latch circuit which is synchronized with the voltage comparison signal and a clock signal to output the voltage control signal.

9. A display apparatus, comprising: a display panel including a plurality of pixels;

a driving circuit which controls the plurality of pixels so as to display an image on the display panel; and a backlight unit which provides the display panel with light, wherein the backlight unit includes a power converter which generates a light source power voltage to a first node in response to a voltage control signal;

at least one light emitting diode string connected between the first node and a second node, and which receives the light source power voltage through the first node; and a controller connected to the second node, wherein the controller detects current of a detection node of the power converter varying based on a duty ratio of the voltage control signal, and controls current flowing through the second node when the detected current is greater than a reference value, wherein the controller comprises:

a voltage controller which outputs the voltage control signal having a pulse width corresponding to a voltage level of the second node; and a current controller which detects the current of the detection node and control the current flowing through the second node when the detected current is greater than the reference value, wherein the current controller comprises:

a comparison circuit which compares a feedback voltage corresponding to the current of the detection node and the reference value to output a detection voltage corresponding to a comparison result; and a feedback control circuit which controls the current flowing through the second node b based on the detection voltage and the voltage level of the second node.

10. The display apparatus of claim 9, wherein the current controller further comprises:

a smoothing circuit which smoothens a voltage of the detection node to output the feedback voltage.

11. The display apparatus of claim 10, wherein the smoothing circuit comprises:

a first resistor connected between the detection node and a ground;

a second resistor connected between the detection node and an input node; and a capacitor connected between the ground and a feedback node, the feedback voltage being a voltage of the feedback node.

12. The display apparatus of claim 10, wherein the comparison circuit comprises:

a first comparison part which compares a voltage level of the input node and a first comparison reference voltage to output a first comparison signal;

a second comparison part which compares the voltage level of the input node and a second comparison reference voltage to output a second comparison signal; and a switching part which outputs any one of a first voltage and a ground voltage as the detection voltage in response to the first and second comparison signals.

13. The display apparatus of claim 12, wherein the switching part comprises:

a first resistor including one end which receives the first voltage and the other end;

a transistor including a first electrode connected to the other end of the first resistor, a second electrode which outputs the detection voltage, and a control electrode commonly connected to the first and second comparison signals; and a second resistor connected to the second electrode of the transistor and a ground.

14. The display apparatus of claim 10, wherein the feedback control circuit comprises:

a current feedback transistor including a first electrode connected to the second node, a second electrode connected to a feedback node, and a control electrode connected to a current control signal;
a pull down resistor connected between the feedback node and a ground;
a comparator which compares a feedback voltage of the feedback node and a reference voltage and to output a comparison signal; and
an adder which adds the comparison signal and the detection voltage to output the current control signal.

15. The display apparatus of claim 10, wherein the power converter comprises:
an inductor connected between a power supply voltage and a first internal node;
a transistor including a first electrode connected to the first internal node, a second electrode connected to a detection node, and a control electrode connected to the voltage control signal;
a diode connected between the first internal node and a second internal node; and
a capacitor connected between the second internal node and a ground,
wherein the second internal node is electrically connected to the first node.

16. The display apparatus of claim 10, wherein
the display panel further comprises:
a plurality of gate lines and a plurality of data lines respectively extending in directions crossing each other; and
the plurality of pixels which are respectively connected to the corresponding gate lines and data lines, and
the driving circuit comprises:
a data driver which drives the plurality of data lines;
a gate driver which drives the plurality of gate lines; and
a timing controller which controls the data driver and the gate driver in response to an image signal and a control signal,
the timing controller providing a ramp signal and the clock signal.

* * * * *